(12) United States Patent
Lissajoux et al.

(10) Patent No.: US 9,472,107 B2
(45) Date of Patent: Oct. 18, 2016

(54) METHOD AND DEVICE FOR DETERMINING A CONTROL SET POINT OF AN AIRCRAFT, ASSOCIATED COMPUTER PROGRAM AND AIRCRAFT

(71) Applicant: THALES, Courbevoie (FR)

(72) Inventors: Sylvain Lissajoux, Toulouse (FR); Bruno Aymeric, Le Haillan (FR); Thibaut Debard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/737,362

(22) Filed: Jun. 11, 2015

(65) Prior Publication Data
US 2015/0364045 A1 Dec. 17, 2015

(30) Foreign Application Priority Data
Jun. 16, 2014 (FR) ..................................... 14 01356

(51) Int. Cl.
| | |
|---|---|
| *G01D 7/02* | (2006.01) |
| *G08G 5/00* | (2006.01) |
| *G01C 23/00* | (2006.01) |
| *G05D 1/02* | (2006.01) |
| *G05D 99/00* | (2006.01) |

(52) U.S. Cl.
CPC ............. *G08G 5/0047* (2013.01); *G01C 23/00* (2013.01); *G05D 1/0202* (2013.01); *G08G 5/0021* (2013.01)

(58) Field of Classification Search
CPC ........ G01D 7/02; G05D 99/00; B64D 31/06; B64C 19/00
USPC .............................. 701/3, 4, 10, 14; 244/183
See application file for complete search history.

(56) References Cited

U.S. PATENT DOCUMENTS

| | | | |
|---|---|---|---|
| 6,469,640 B2 | 10/2002 | Wyatt | |
| 8,027,758 B2* | 9/2011 | Ferro | G01C 23/00 244/183 |
| 2005/0261810 A1 | 11/2005 | Artini et al. | |
| 2011/0238240 A1 | 9/2011 | Barral et al. | |
| 2014/0354456 A1* | 12/2014 | Gannon | G08G 5/0047 340/972 |

FOREIGN PATENT DOCUMENTS

FR 2958033 A1 9/2011

OTHER PUBLICATIONS

Search Report and Written Opinion dated Feb. 17, 2015 for French Patent Application No. 1401356 filed on Jun. 16, 2014.

\* cited by examiner

*Primary Examiner* — Tan Q Nguyen
(74) *Attorney, Agent, or Firm* — Knobbe, Martens, Olson & Bear, LLP (57) ABSTRACT

A method and device for determining a control set point of an aircraft, an associated computer program and an aircraft are disclosed. In one aspect, the method includes calculating a performance scale in the form of slope values of the aircraft, the performance scale including a slope characteristic value, the slope characteristic value being associated with a corresponding performance characteristic value. The method also includes acquiring a guidance set point and displaying the acquired guidance set point, in the form of a slope value with respect to the performance scale. The method further includes determining a slope characteristic value associated with a guidance set point displayed in the form of a slope value, and calculating an aircraft control set point, the control set point being calculated relative to the performance characteristic value corresponding to the determined slope characteristic value.

16 Claims, 5 Drawing Sheets

METHOD AND DEVICE FOR DETERMINING A CONTROL SET POINT OF AN AIRCRAFT, ASSOCIATED COMPUTER PROGRAM AND AIRCRAFT

CROSS-REFERENCE TO RELATED APPLICATIONS

This application claims benefit under 35 U.S.C. §119 of French Application No. 14 01356, filed Jun. 16, 2014, which is herein incorporated by reference in its entirety.

BACKGROUND

1. Technological Field

The described technology generally relates to a method for determining a control set point of an aircraft, the control set point being intended to be transmitted to at least one avionics system from at least one actuator control system and at least one guidance system.

2. Description of the Related Technology

In order to vary the acceleration of a fixed-wing aircraft, the flight crew may generally act on the thrust, the drag, and the tractive force or braking force of the wheels on the ground. In order to act on the thrust, they generally have at their disposal an auto-thrust system, also known as auto-throttle capable of automatically maintaining a set point speed or a thrust level via control of the engines. The thrust can also be used on the ground in order to decelerate via the "reverse" function. In order to act on the drag, the crew generally have at their disposal an airbrake system used in flight or on the ground beyond a certain speed. On the ground, the crew may also act on the tractive force or braking force of the wheels so as to further modify the ground acceleration of the aircraft.

In order to cause the varying of acceleration of a rotary wing aircraft, the crew generally have at their disposal a collective control lever which, by acting in tandem with an engine control system such as a Full Authority Digital Engine Control (FADEC), provides the ability to cause varying of the thrust.

During the flight, at the time of a change in flight path trajectory, a variation in thrust or drag is necessary for maintaining the speed of the aircraft. Typically, the aircraft assumes the slope desired by the crew and in response thereto the thrust and drag are accordingly adjusted to the extent of their achievable domains in order to maintain the speed of the aircraft. However, it sometimes happens that the thrust and/or the drag achievable by the actuators of the aircraft is insufficient to compensate for the variation in slope required by the crew and thus to maintain the ordered speed or acceleration. In such situations, the crew must adjust the slope of the aircraft in response thereto if they wish to maintain the speed of the aircraft or to satisfy the ordered acceleration, which requires constant vigilance by the crew and is likely to bring about dangerous situations.

There is therefore a need to set in place a capability for viewing the performance domains that are achievable by an aircraft and for servo-controlling the guidance set points selected by the crew on the performance domains achievable by the aircraft.

It is known from the documents U.S. Pat. No. 6,469,640 B and US 2005/0261810 A display devices for displaying thrust levels accessible by an aircraft. The document US 2011/0238240 A in particular, describes a display device that enables the pilot to directly view the range of energy variation attainable by an aircraft.

However, these display devices only provide a visual aid to the crew.

SUMMARY OF CERTAIN INVENTIVE ASPECTS

An objective of certain inventive aspects is to provide a method and device for determining a control set point on the basis of an acquired guidance set point, the control set point being servo-controlled on the domains of performance achievable by the aircraft, in order to improve the flight safety of the aircraft and to reduce the workload of the crew.

To this end, one inventive aspect is a method comprising: the determination of at least one slope characteristic value associated with a corresponding guidance set point, displayed in the form of a slope value; and the calculation of at least one control set point for the aircraft, each control set point being calculated relative to the performance characteristic value corresponding to the associated slope characteristic value for each guidance set point displayed in the form of a slope value.

The control set point determination method thus makes it possible, on the basis of at least one guidance set point, to determine at least one control set point intended to be transmitted to an avionics system from at least one actuator control system and at least one guidance system.

Another aspect is a method for determining the control set point, intended to be carried out by an electronic device, for determining the control set point, the method comprising the calculation of a performance scale in the form of slope values of the aircraft, the performance scale comprising at least one slope characteristic value, each slope characteristic value being associated with a corresponding performance characteristic value from among extreme values of thrust, extreme values of drag, extreme values of ground acceleration, predetermined specific values of thrust, predetermined specific values of drag, predetermined specific values of ground acceleration and characteristic values of guidance set points.

The determination method can also include the acquisition of at least one guidance set point and the display of at least one guidance set point among the acquired guidance set point(s), in the form of a slope value with respect to the performance scale.

Aspects also relate to a non-transitory computer-readable medium including a computer program comprising of software instructions that, when carried out by a computer, implement such a method of determination.

Aspects also relate to an electronic device for determining a control set point of an aircraft.

Further aspects also relate to an aircraft including at least one avionics system from at least one actuator control system and at least one guidance system, as well as such an electronic device for determining the control set point of the aircraft, the control set point being intended to be transmitted to the corresponding avionics system.

Certain aspects are applicable to the field of avionics, and more particularly relates to the way to calculate and display data related to the performance of an aircraft equipped with an engine control system, an aerodynamic brake control system such as an air brake system, or a down force system, for acting on a drag force on the aircraft, with a traction control system for acting on a tractive force exerted on the ground by the wheels, and with a ground brake control system for acting on a braking force exerted on the ground by the wheels. The performance mentioned above are related to the acceleration and deceleration capabilities of the aircraft and to the slopes which could be balanced for given flight conditions.

According to other aspects, the set point determination method comprises one or more of the following features, taken into consideration in isolation or in accordance with any technically possible combinations: the associated slope characteristic value is the slope characteristic gradient value which, among the slope characteristic gradient value(s) towards which the displayed guidance set point converges, is the closest to the displayed guidance set point.

The associated slope characteristic value is the slope characteristic value which is the closest to the displayed guidance set point.

The method can further comprise: the calculation of a deviation between each displayed guidance set point and each slope characteristic value associated with the displayed guidance set point, and the positioning of the value of the guidance set point at the associated slope characteristic value, only when the calculated deviation belongs to a predetermined range of values.

The positioning of the value of the guidance set point at the associated slope characteristic value is displayed in the form of a link between a symbol representing the guidance set point and the associated characteristic slope.

The aircraft comprises at least one primary control member adapted to be manipulated by the user in order to select a guidance set point, and the acquired guidance set point is a set point which is selected using the primary control member.

the performance scale is calculated based on a speed selected from a speed set point, and an estimate of the speed of the aircraft.

The performance scale is calculated by taking into account the characteristics of the aircraft selected from the altitude of the aircraft, a configuration of the aircraft, the weight of the aircraft and the icing conditions of the aircraft.

The performance scale comprises graduations in slope values, the origin of the performance scale corresponding to an artificial horizon.

When the acquired guidance set point is not a slope set point, the acquired guidance set point is converted into a slope value to be compared to the values of the performance scale.

The acquisition step comprises the acquisition of two guidance set points, the displaying step comprises the display of two guidance set points, each in the form of a slope value with respect to the performance scale and the calculating step comprises the calculation of two respective control set points.

Each slope characteristic value is selected from: a first group of values including: a first value associated with a maximum level of engine thrust and with a retracted air brakes position, a second value associated with an engine thrust level and with a retracted air brakes position, a third value associated with a reduced level of engine thrust and with an intermediate position between retraction and deployment of the air brakes, a fourth value associated with a minimum level of engine thrust and with a fully deployed position of the air brakes, a fifth value associated with a specific level of engine thrust and with a retracted position of the air brakes; and a second group of values including: a sixth value associated with a maximum level of engine thrust and with inactive brakes or thrust reversers, a seventh value associated with a maximum braking level of the brakes with the use of thrust reversers at their maximum level, an eighth value associated with a reduced level of engine thrust and with the positions of brakes or thrust reversers set so as to reach an exit of a runway, a ninth value associated with a reduced level of engine thrust and with the positions of brakes or thrust reversers set so as to bring the aircraft to a stop at the end of a runway, a tenth value associated with a reduced level of engine thrust and with inactive brakes or thrust reversers, an eleventh value associated with a predetermined level of deceleration.

Aspects also relate to a non-transitory computer-readable medium including a computer program comprising of software instructions that, when carried out by a computer, implement the method of determination as defined here above.

Further aspects also relate to an electronic device for determining a control set point of an aircraft, the control set point being intended to be transmitted to at least one avionics system from at least one actuator control system and at least one guidance system, the device comprising: a calculation capability for calculating a performance scale in the form of slope values of the aircraft, the performance scale comprising at least one slope characteristic value, each slope characteristic value being associated with a corresponding performance characteristic value from among extreme values of thrust, extreme values of drag, extreme values of ground acceleration, predetermined specific values of thrust, predetermined specific values of drag, predetermined specific values of ground acceleration and characteristic values of guidance set points; an acquisition capability for acquiring at least one guidance set point; a display capability for displaying of at least one guidance set among the acquired guidance set point(s), in the form of a slope value with respect to the performance scale; a determination capability for determining at least one slope characteristic value associated with a corresponding guidance set point, displayed in the form of a slope value; and a calculation capability for calculating at least one control set point for the aircraft, each control set point being calculated relative to the performance characteristic value corresponding to the associated slope characteristic value for each guidance set point displayed in the form of a slope value.

According to another aspect, the set point determination device further comprises: a calculation capability for calculating a deviation between each displayed guidance set point and each slope characteristic value associated with the displayed guidance set point; and a positioning capability for positioning the value of the guidance set point at the associated slope characteristic value, only when the calculated deviation belongs to a predetermined range of values.

Aspects also relate an aircraft including at least one avionics system from at least one actuator control system and at least one guidance system, as well as such an electronic device for determining a control set point of the aircraft, the control set point being intended to be transmitted to the corresponding avionics system, wherein the electronic device is as defined here above.

BRIEF DESCRIPTION OF THE DRAWINGS

These characteristic features and advantages of the described technology will become apparent upon reading the description which will follow, given solely by way of non-limiting example, and with reference being made to the attached drawings in which:

FIG. 2 is a schematic representation of the aircraft shown in FIG. 1, the aircraft including a plurality of engines, wheels, an engine control system to be used for varying a thrust force generated by the engines and forming a first actuator control system, an aerodynamic brake control system for acting on a drag force of the aircraft and forming a second actuator control system, a ground traction control system for acting on a tractive force exerted on the ground by the wheels, the ground traction control system forming a third actuator control system, a ground brake control system for acting on a braking force exerted on the ground by the wheels, the ground brake control system forming a fourth actuator control system, a flight control system, an automatic pilot system, a control stick and a lever, also known as a collective lever in the case of a rotary wing aircraft, forming the primary control members adapted to be manipulated for the piloting and control of the aircraft, and an electronic device for determining a control set point for the aircraft;

DETAILED DESCRIPTION OF CERTAIN INVENTIVE EMBODIMENTS

Figure 1:
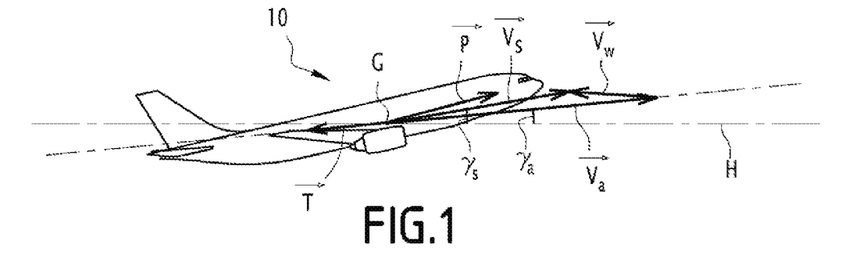
FIG. 1 represents in a schematic manner the thrust and drag forces applied to an aircraft as well as its air speed vector and its ground speed vector.

In FIG. 1, an aircraft 10, such as an airplane or a helicopter, is subjected to a thrust force P and a drag force T, each being applied to the centre of gravity G of the aircraft. The aircraft 10 moves relative to the ground along a ground speed vector $V_s$ which forms together with the horizontal H an angle $\gamma_s$ known as ground slope of the aircraft, and moves relative to the air along an air speed vector $V_a$ that forms together with the horizontal H an angle $\gamma_a$ known as air slope of the aircraft. The difference between the ground speed vector $V_s$ and the air speed vector $V_a$ corresponds to the wind speed vector $V_w$ which represents the displacement of the air relative to the ground.

In FIG. 1, the vectors of thrust, drag, ground speed, air speed, and wind speed have been identified by means of vector notations with an arrow. By convention in this present patent application and for the purposes of simplification of the reference notations, the abovementioned vectors have been identified by means of reference notations with capital letters and without any arrows.

Figure 2:
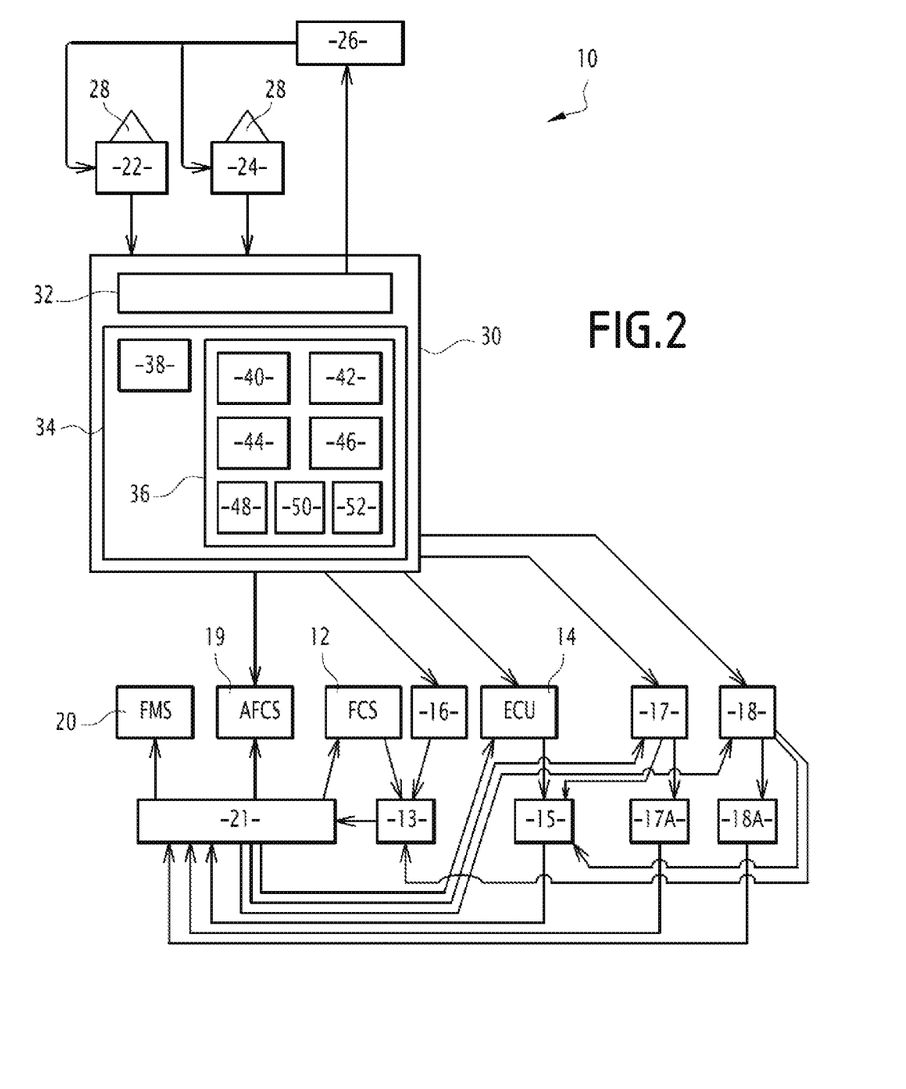

In FIG. 2, the aircraft 10 includes a flight control system (FCS) 12, also denoted as fly by wire (FBW), for acting on a set of flight control surfaces and actuators 13 of the aircraft, the flight control surfaces being for example the ailerons, the elevator, or the rudder.

The aircraft 10 includes an engine control system 14, also denoted as engine control unit (ECU), for causing the varying of the thrust of at least one engine 15 of the aircraft, such as a reactor, a turboprop, or a turbine. The engine control system 14 forms a first actuator control system of the aircraft. When the aircraft 10 includes a plurality of engines 15, the engine control system 14 is capable of causing the varying of the energy delivered by all of the engines 15.

The aircraft 10 also includes an aerodynamic brake control system 16, such as an air brake system, or a negative lift or down force system, for acting on the control surfaces of the assembly 13 and thus acting on the drag force T, with the aerodynamic brake control system 16 forming a second actuator control system.

The aircraft 10 includes a ground traction control system 17 for causing the varying of the energy delivered by at least one additional engine 17A, each additional engine 17A being capable of driving the wheels of a landing gear, not represented. The ground traction control system 17 is thus capable of acting on a tractive force R exerted on the ground by the wheels. The ground traction control system 17 then forms a third actuator control system.

The aircraft 10 also includes a ground brake control system 18 for controlling a brake system 18A and for thus acting on a braking force B exerted on the ground by the wheels. The ground brake control system 18 then forms a fourth actuator control system.

The aircraft 10 includes at least one guidance system, such as a flight control system 12, an automatic flight control system (AFCS) 19, also known as automatic pilot and denoted as PA or AP, or even such as a flight management system (FMS) 20 for managing the flight of the aircraft. In addition, the guidance system is an auto-thrust device, not shown, also known as auto-throttle.

The aircraft 10 comprises a set of sensors 21 capable of measuring different variable values related to the aircraft, in particular the variable values associated with the set of flight control surfaces and actuators 13 and with the movement of the aircraft 10, and capable of transmitting the measured values of the variables to: the flight control system 12, the engine control system 14, the aerodynamic brake control system 16, the ground traction system 17, the ground brake control system 18, the automatic pilot system 19, and/or to the flight management system 20.

The aircraft 10 includes one or more control sticks or mini-control sticks 22 and one or more control levers or mini-levers 24, each forming a primary control member able to be appropriately manipulated by the crew of the aircraft 26 for the piloting and control of the aircraft. The mini-lever 24 refers to a control lever with a force feedback towards an equilibrium position. In the case of a rotary wing aircraft, the lever or mini-lever refers to the collective control lever. In subsequent sections, the term "control stick" shall refer to either a control stick or a mini-control stick and the term "control lever" shall refer to either a control lever or mini-control lever.

In addition, the aircraft 10 includes an ancillary control member 28 that makes it possible to increment or decrement a set point, or even to directly designate the value of this set point.

The aircraft 10 includes an electronic set point determination device 30 for determining a control set point of the aircraft, the control set point being intended to be transmitted to at least one avionics system from among one of the actuator control systems 14, 16, 17, 18 and one of the guidance systems 12, 19, 20, that is to say in this example, the engine control system 14, the aerodynamic brake control system 16, the ground traction control system 17, the ground brake control system 18, the flight control system 12, the automatic pilot system 19, and the flight management system 20.

The flight control system 12 is known per se, and provides the ability, through its action on the assembly of control surfaces and actuators 13 to cause a change in attitude of the aircraft 10. In addition, the flight control system 12 includes one or more guidance functional features and thus forms an aircraft guidance system 10.

The engine control system 14 is known per se, and provides the ability to cause a variation in the thrust of at least one engine 15 of the aircraft.

The aerodynamic brake control system 16 provides the ability to cause a variation in the drag T applied to the aircraft. The aerodynamic brake control system 16 is capable of bringing about the variation in the drag force T via an action on the control surfaces of the assembly 13.

In the example shown in FIG. 2, the aerodynamic brake control system 16 is a separate system that is distinct from the other systems 12, 14, 17, 18, 19, and 20 of the aircraft, in particular from the flight control system 12. Alternatively not shown, the aerodynamic brake control system 16 is integrated into the flight control system 12.

The ground traction control system 17 and the ground brake control system 18 respectively, are known per se, and make it possible to act via the one or more additional engines 17A on the tractive force R, respectively via the brake system 18A, or even via the additional engine 17A, on the braking force B. The ground traction control system 17 and the ground brake control system 18 are thus capable of acting on the tractive force R or the braking force B exerted by means of the wheels when the aircraft is on the ground.

The automatic pilot system 19 and/or the auto-thrust device are known per se, and provide the ability to act on the flight path trajectory of the aircraft.

The flight management system 20 is known per se, and provides the ability to manage a flight plan of the aircraft 10, from the take-off to the landing thereof.

The sensors 21 are in particular capable of providing information and data relating to the position of the elements of the assembly of control surfaces and actuators 13, for example the position of a control surface, and/or related to the state of the engine or engines 15, and/or relating to the high lift configurations, and/or relating to the deployed state or non-deployed state of the landing gears.

The sensors 21 are further capable of providing information and data relating to the positioning of the aircraft 10, such as attitudes, accelerations, a ground speed value, an air speed value, a wheel speed value, a route, an altitude, a latitude, a longitude, and/or data relating to the environment of the aircraft 10, desirably relating to the atmosphere in which the aircraft is operating 10 for example a pressure or even a temperature.

Each control stick 22 and each control lever 24 is capable of enabling a user to select a guidance set point. The term guidance set point generally refers to a path trajectory set point. The guidance set point of the aircraft is for example a slope set point or a vertical speed set point that may be selected by using the longitudinal movements of the control stick 22. Alternatively or in addition, the guidance set point is for example a set point for acceleration along the direction borne by the speed vector selected from the air speed vector $V_a$ and the ground speed vector $V_s$, referred to as the acceleration on slope set point that may be selected by using the control lever 24. Alternatively or in addition, the guidance set point is for example, a speed set point for the aircraft, expressed in the form of a computed airspeed (CAS) or MACH, or even an altitude set point. The speed set point or altitude set point is then designated for example by using a secondary control capability, such as a selector switch on a control panel, a touch key of a touch screen, or a voice control system, or designated by using for example a lever 24.

Alternatively, on a rotary wing aircraft, the slope set point or the vertical speed set point is selected by means of the lever 24 and the acceleration on slope set point is selected by using the longitudinal movements of the control stick 22.

Each control stick 22 is capable of enabling a user to control the attitudes of the aircraft 10. In a conventional manner, each control stick 22 is a control lever that is adapted to be operated based on transverse movements, longitudinal movements or any combination of transverse and longitudinal movements. In other words, each control stick 22 is movable along at least two separate and distinct directions of motion, the directions of motion being further perpendicular to each other in the described example.

More specifically, each control stick 22 is capable of enabling a user to control the angle of roll by means of the transverse movements of the control stick, and the angle of pitch or the load factor by means of the longitudinal movements of the control stick.

Each control stick 22 is capable of enabling a user to select a guidance set point. Such a guidance set point is, for example, as mentioned previously, a vertical speed set point or a slope set point.

Each lever 24 is capable of enabling a user to select a value for an acceleration set point Acc_cons along the direction taken by the speed vector from the air speed vector $V_a$ and the ground speed vector $V_s$, referred to as acceleration on slope set point Acc_cons or a value of a longitudinal speed set point. Each lever 24 is, for example, a control lever that is adapted to be operated based on longitudinal movements. In other words, each lever 24 is movable along a direction of motion, that is to say the longitudinal direction.

Alternatively, on a rotary wing aircraft, each lever 24 is adapted to be operated based on vertical movements. In other words, each lever 24 is movable along a direction of motion, that is to say the vertical direction.

Alternatively, each control lever 24 is a conventional control lever able to act only on the thrust of associated engines and not providing for the selection of an acceleration on slope set point Acc_cons.

Every control stick 22 and every control lever 24 includes a rest position for each direction of motion, desirably corresponding to the middle position between the extreme values of a displacement distance D for each control stick 22 or each control lever 24 along the corresponding direction of motion.

In addition, each control stick 22 and each control lever 24 are each a control lever with controllable mechanical force feedback, that is to say controllable, and a mechanical force feedback law defines the mechanical force provided by each control stick 22 and each control lever 24 based on the displacement distance D for each control stick 22 or each control lever 24 relative to its rest position. According to this complement, each control stick 22 and each control lever 24 are then generally more specifically known as mini-control stick and mini-control lever.

Additionally, the mechanical force feedback law is a function of other parameters, such as the state of the actuators or the guidance systems for example.

In addition, each control lever forming each lever 24 and/or each control stick 22 includes at least one predetermined reference position, the reference position(s) corresponding for example to position notches, not shown.

In addition, the ancillary control member 28 is attached to each control stick 22 and/or optionally to each lever 24. It is movable along at least one direction, in order to increment or decrement at least one corresponding guidance set point. When the ancillary control member 28 is positioned on the control lever 24, the corresponding guidance set point is desirably an air speed set point (CAS, true airspeed (TAS), MACH) or ground taxi speed set point. When the ancillary control member 28 is movable in two distinct directions, it is capable of incrementing or decrementing two separate guidance set points. When the ancillary control member 28 is positioned over the control stick 22, it is desirably movable in two distinct perpendicular directions, one being longitudinal and the other being transverse. The guidance set point corresponding to the longitudinal movement of the ancillary control member 28 is then desirably the altitude, and the guidance set point corresponding to the transverse movement of the ancillary control member 28 is then desirably the heading or the course.

The ancillary control member 28 for example has a conical shaped form when it is movable in two distinct directions, or is in the form of a knob when it is movable in one single direction. The ancillary control member 28 associated with each control stick 22 desirably has a conical shaped form, and is also known as a fir, and the one associated with each control lever 24 desirably has a knob shaped form.

Alternatively, on a rotary wing aircraft, the guidance set point corresponding to the longitudinal movement of the ancillary control member 28 is the speed when it is attached to the control stick 22 and the altitude when it is attached to the control lever 24.

The determination device 30 includes a display screen 32 and a data processing unit 34 formed, for example by a memory storage 36 and a processor 38 associated with the memory storage 36.

In the example shown in FIG. 2, the determination device 30 is separate and distinct from the flight control system 12, the engine control system 14, the aerodynamic brake control system 16, the ground traction control system 17 of the ground brake control system 18, the automatic pilot system 19 and the flight management system 20.

Alternatively, not shown, the determination device 30 is integrated with any one of the elements selected from: the flight control system 12, the engine control system 14, the aerodynamic brake control system 16, the ground traction control system 17, the ground brake control system 18, the automatic pilot system 19 and the flight management system 20. The data processing unit 34 then corresponds to the data processing unit, not shown, of the element. According to this alternative, the determination device 30 is desirably integrated into the automatic pilot system 19.

The memory storage 36 is capable of storing a software program 40 for measuring a mechanical variable value relative to, respectively, the control stick 22, and the lever 24, such as the displacement distance D of the control stick 22, and of the lever 24 respectively, or a mechanical force F applied by the crew 26 respectively against the control stick 22 and the lever 24, forming the control lever, and for calculating a value for a guidance set point as a function of the mechanical variable value D, F, and optionally of the previous value of the guidance set point.

The memory storage 36 is also capable of storing a software program 42 for acquiring a guidance set point calculated by an avionics system external to the determination device 30.

The memory storage 36 is also capable of storing a software program 44 for conversion of the value of the guidance set point into a slope value when the guidance set point is an acceleration on slope set point or vertical speed set point.

The memory storage 36 is further capable of storing a software program 46 for calculating a performance scale E in the form slope values of the aircraft. The performance scale E comprises at least one slope characteristic value, each slope characteristic value being associated with a corresponding performance characteristic value from among extreme values of thrust, extreme values of drag, extreme values of ground acceleration, predetermined specific values of thrust, predetermined specific values of drag, predetermined specific values of ground acceleration and characteristic values of guidance set points. The characteristic values of guidance set points correspond for example to a slope calculated by the flight management system 20 for reaching the flight path.

The memory storage 36 is also capable of storing a software program 48 for determining a slope characteristic value associated with a guidance set point displayed in the form of a slope value. In other words, the slope characteristic value determination software program 48 is capable of determining, from among the values of the calculated scale E, a value associated with the guidance set point displayed in the form of a slope value.

The slope characteristic value associated is, for example, the slope characteristic value which, out of the one or more slope characteristic values towards which the displayed guidance set point converges, is the closest to the displayed guidance set point. The one or more slope characteristic values towards which the displayed guidance set point converges, are the one or more slope characteristic values for which the derivative relative to time of the absolute value of an algebraic deviation between the slope characteristic value and the displayed guidance set point is negative.

Alternatively, the slope characteristic value associated is the slope characteristic value that is the closest to the displayed guidance set point.

The memory storage 36 is also capable of storing a software program 50 capable of calculating a control set point of the aircraft, the calculated set point being servo-controlled relative to the performance characteristic value corresponding to the slope characteristic value associated with the guidance set point displayed in the form of a slope value, and for transmitting the calculated control set point to at least one avionics system among one of the actuator control systems 14, 16, 17, 18 and one of the guidance systems 12, 19, 20.

According to a further optional aspect, the determination software program 48 is in addition capable of calculating an algebraic deviation $\Delta_c$ between the guidance set point displayed in the form of a slope value and the slope characteristic value of the performance scale E associated with this displayed guidance set point, and of comparing this algebraic deviation $\Delta_c$ to a range of reference values $\Delta_{ref}$.

According to this additional aspect, the calculation and transmission software program 50 is further capable of positioning the value of the guidance set point at the slope characteristic value associated when special conditions, referred to as conditions of adherence, are brought about, for example when the calculated algebraic deviation $\Delta_c$ belongs within the range of reference values $\Delta_{ref}$.

In addition, this positioning is achieved only when the absolute value of the algebraic deviation $\Delta_c$ is in the process of diminishing over the course of time, that is to say when the derivative relative to time of the absolute value of the algebraic deviation $\Delta_c$ is negative, in other words when the algebraic deviation $\Delta_c$ is in the process of being reduced, and/or when the mechanical variable value D, F, respectively of the control stick 22 and the control lever 24, is comprised within a predefined range of values.

After the positioning of the guidance set point value at the associated slope characteristic value, a modification of the value of the guidance set point, for example by making use of the control stick 22 or the lever 24, cancels the positioning, also referred to as adherence. This then makes it possible to break off the adherence with the slope characteristic value established previously, that is to say, to "dissociate" the guidance set point from the slope characteristic value to which it had adhered.

The memory storage 36 is capable of storing a software program 52 for displaying information and data on the display screen 32 of the determination device 30, in particular the performance scale E and a symbol representing the guidance set point.

The processor 38 is capable of loading and executing each of the software programs 40, 42, 44, 46, 48, 50 and 52.

The measurement and calculation software program 40, the acquisition software program 42, the conversion software program 44, the performance scale calculation software program 46, the determination software program 48, the calculation and transmission software program 50, and the display software program 52, respectively form the measurement and calculation capability for measuring the mechanical variable D, F of the control stick or of the control lever and for calculating a value of the guidance set point as a function of the mechanical variable value D, F measured, the data acquisition capability for acquiring a value of the guidance set point calculated by an avionics system external to the determination device, the conversion capability for converting the value of the guidance set point into a slope value, the calculation capability for calculating a performance scale, the determination capability for determining the slope characteristic value associated with the guidance set point displayed in the form of a slope value, the calculation and transmission capability for calculating a control set point for the aircraft and for transmitting this control set point to at least one corresponding avionics system and the display capability for displaying information and data on the screen.

Alternatively, the measurement and calculation capability 40, the acquisition capability 42, the conversion capability 44, the scale calculation capability 46, the determination capability 48, the calculation and transmission capability 50, and the display capability 52 are developed in the form of programmable logic components, or even in the form of dedicated integrated circuits.

According to the optional additional aspect previously described, the software program 48 in addition forms the capability for calculating an algebraic deviation $\Delta_c$ between the guidance set point displayed in the form of a slope value and the slope characteristic value associated with this displayed guidance set point, and for comparing the algebraic deviation $\Delta_c$ with the range of reference values $\Delta_{ref}$, and the software program 50 further also forms the positioning capability for positioning the value of the guidance set point at the associated slope characteristic value.

The measurement and calculation software program 40 is capable of measuring the value of the mechanical variable value D, F, respectively of the control stick 22 and the control lever 24, comprised between a minimum value Dmin and a maximum value Dmax, and a minimum value Fmin and a maximum value Fmax, respectively. By convention, in this patent application, the minimum values Dmin, Fmin are negative, the maximum values Dmax, Fmax are positive, and the rest position respectively of the control stick 22 and the control lever 24 corresponds to a null value of the displacement distance D.

The measurement and calculation software program 40 is then capable of converting the measured value of the mechanical variable D, F into a guidance control increment, with the rest position respectively of the control stick 22, and of the lever 24 corresponding to a null control increment. The control increment value is then multiplied, by the measurement and calculation software program 40, by a coefficient K depending on a step of calculation of the algorithm before being added to the preceding value of the guidance set point. This then is tantamount to performing a time integration of the control increment in order to obtain the guidance set point. In other words, the maintaining of the control stick 22, and the lever 24, respectively, in a position other than the rest position will then result in a constant evolution of the guidance set point.

The calculated guidance set point is then sent, on the one hand, to the display software program 52, and on the other hand, to the conversion software program 44.

In this example, the mechanical variable value D, F respectively of the control stick 22 and the lever 24, corresponds to an increment/decrement of the guidance set point.

Alternatively, the mechanical variable value D, F respectively of the control stick 22 and the lever 24, corresponds to a level of the guidance set point. According to this alternative, the measurement and calculation software program 40 is in an analogous manner capable of measuring the value of the mechanical variable value D, F respectively of the control stick 22 and the lever 24, comprised between the minimum value Dmin, Fmin, and the maximum value Dmax, Fmax. The measurement and calculation software program 40 is then capable of converting the measured value of the mechanical variable value D, F into a command, in an optional manner, by application of a nonlinear function in order to enable a precise selection of low commands and of extreme commands corresponding to extreme displacements respectively of the control stick 22 and the lever 24.

According to this alternative, the measurement and calculation software program 40 is then capable of converting the command into the guidance set point, by taking into account in an optional manner the following criteria: the ergonomics of the control stick (displacement, height, etc.), the type of aircraft, as well as its engine type and the performance elements of the engine (number of engines in operation, etc.), and the phase of flight (takeoff, cruising, approach, on the ground) determined among other things by the measurement of aircraft parameters (altitude, speed, configuration of the aircraft).

Additionally or alternatively, when the control lever(s) respectively forming the control stick 22 and the lever 24 is positioned in a reference corresponding predetermined position, the value of the guidance set point is set to be equal to a predefined value associated with the reference predetermined position. The maximum value of the guidance set point corresponds for example to a predetermined reference position, such as a mechanical position detent.

The guidance set point thus calculated is, in a manner analogous to the alternative previously described above, sent to the display software program 52, on the one hand, and to the conversion software program 44, on the other hand.

The data acquisition software program 42 is capable of acquiring a value of the guidance set point, when the latter is, according to another mode of operation, calculated by an avionics system external to the determination device 30.

According to this alternative mode of operation, the value of the guidance set point taken into account by the conversion software program 46 is the set point value derived from the acquisition software program 42, in place of the one derived from the measurement and calculation software program 40.

The conversion software program 44 is capable of converting the value of the guidance set point into a value expressed in degrees when the guidance set point is not expressed in degrees, for example when the guidance set point is an acceleration on slope set point.

Thus, when the guidance set point is an acceleration on slope set point in m/s², the acceleration on slope set point expressed in degrees then satisfies the following equation:

$$Acc_p = C_{currentslope} + \frac{Acc_i}{g} * \frac{180}{\pi} \quad (1)$$

where $Acc_p$ represents the acceleration on slope set point converted into a slope value in degrees;

$Acc_i$ represents the acceleration on slope set point expressed in m/s²;

$C_{currentslope}$ represents a value in degrees chosen from a slope set point or a set point converted into a slope, the null value, and the slope of the aircraft;

$180/\pi$ represents the conversion factor for converting radians into degrees; and g is the acceleration due to gravity in m/s².

The calculation software for calculating a performance scale 46 is capable of calculating the performance scale E.

The performance characteristic values of the performance scale E are chosen from among values of thrust and drag when the aircraft 10 is in flight, that is to say when the aircraft 10 is not in contact with the ground, and from ground acceleration values when the aircraft 10 is on the ground.

Figure 4:
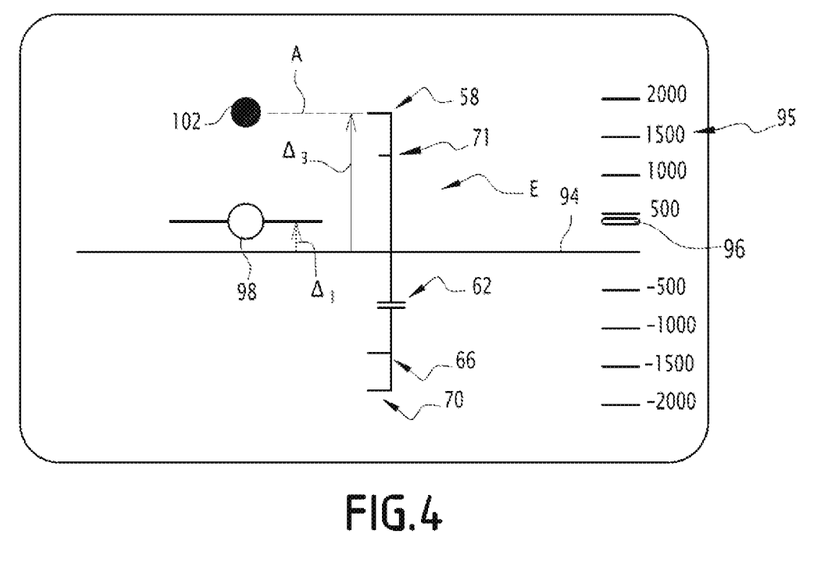
FIG. 4 is a schematic representation of data displayed on a screen of the set point determination device shown in FIG. 2 when the aircraft is in flight.

Thus, when the aircraft 10 is in flight, as illustrated in FIG. 4, the slope characteristic values correspond to specific levels of engine thrust and to particular positions of air-brakes. The software program 46 is then able to associate with the performance scale E various different slope characteristic values corresponding to performance characteristic values.

By way of example, in FIG. 4, when the aircraft 10 is in flight, each slope characteristic value is selected from a first group of values including: a first slope characteristic value 58 corresponding to a maximum level of engine thrust and to a retracted position of the air brakes, a second slope characteristic value 62 corresponding to a minimum level of engine thrust and to a retracted position of the air brakes, a third slope characteristic value corresponding to a minimum level of engine thrust and to an intermediate position between retraction and deployment of the airbrakes, a fourth slope characteristic value 70 corresponding to a minimum level of engine thrust and to a fully deployed position of the air brakes, and a fifth slope characteristic value 71 corresponding to a specific level of engine thrust and to a retracted position of the air brakes.

Advantageously, the maximum engine thrust level is adjusted based on the phase of the flight. By way of example, the maximum level of engine thrust is take off/go around (TO/GA) during the approach or take-off phase, climb (CLB) in the cruise phase without failure engine, and maximum continuous thrust (MCT) in the cruise phase with engine failure.

Advantageously, the minimum level of engine thrust is adjusted based on the flight conditions. By way of example, the minimum level of engine thrust is an idle thrust level (IDLE) during nominal flight conditions, or a thrust level that is higher than IDLE allowing the operation of de-icing systems in icing conditions.

When the aircraft is on the ground, the slope characteristic values correspond to particular levels of ground acceleration, that is to say, to particular levels of speed of the engine(s) 15, 17A and to levels of ground deceleration related to the positions of brakes or particular thrust reversers, the ground deceleration being a negative ground acceleration.

Figure 5:
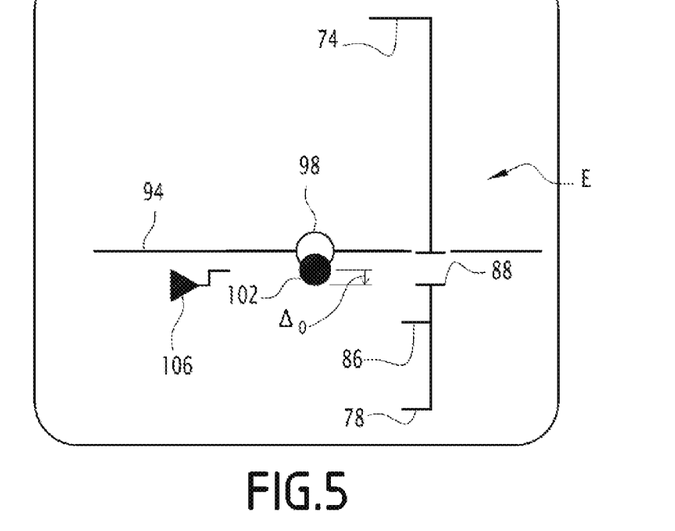
FIG. 5 is a schematic representation similar to that shown in FIG. 4 when the aircraft is in the "roll-out" phase on the ground.
Figure 6:
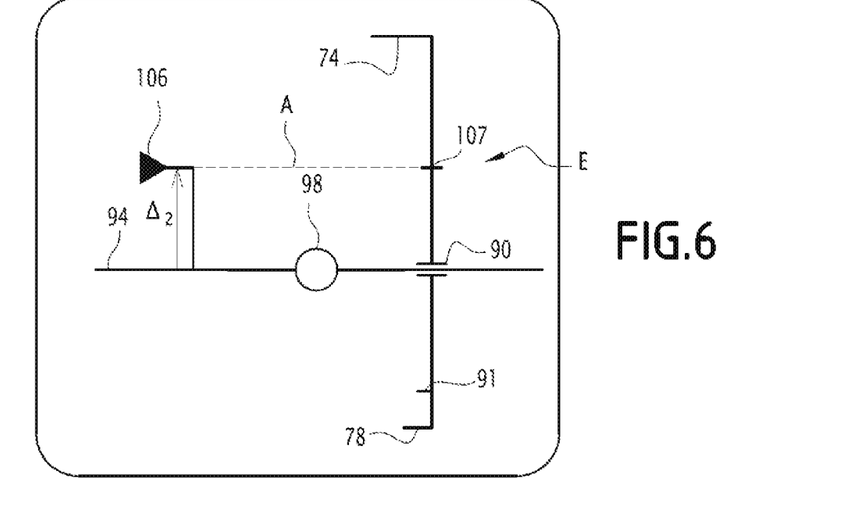
FIG. 6 is a schematic representation similar to that shown in FIG. 4 when the aircraft is in the "taxi" phase on the ground.
Figure 7:
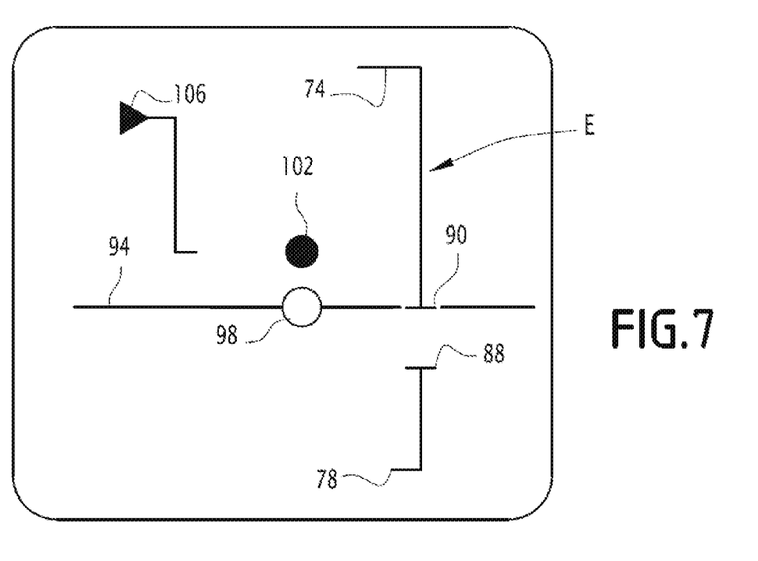
FIG. 7 is a schematic representation similar to that shown in FIG. 4 when the aircraft is in the "take-off" phase on the ground.

In addition, on the ground, it is possible to distinguish three phases of operation of the aircraft: a first phase, illustrated in FIG. 5, and commonly known as "roll-out", corresponding to the landing of the aircraft and to its exit from the runway; a second phase, illustrated in FIG. 6 and commonly known as "taxi", corresponding to the airport navigation; and a third phase, illustrated in FIG. 7 and commonly known as "take-off", corresponding to the departure of the aircraft at the end of the runway until its take-off.

For each of these three phases, the software program 46 is able to associate with the performance scale E different slope characteristic values corresponding to performance characteristic values. By way of example, during a phase corresponding to the landing of the aircraft, as illustrated by the scale E shown in FIG. 5, the scale E will present a sixth slope characteristic value 74 corresponding to a maximum level of engine thrust and to brakes or thrust reversers that are inactive allowing for take-off or enabling an effective go-around procedure if the approach or landing is missed; a seventh slope characteristic value 78 corresponding to a maximum braking of the brakes with the use of the thrust reversers at their maximum level, this seventh value 78 making possible a maximum deceleration; an eighth slope characteristic value 86 corresponding to a reduced level of engine thrust and to positions of brakes or thrust reversers that make possible a suitable deceleration in order for the aircraft to rapidly reach an exit of the runway; a ninth slope characteristic value 88 corresponding to a reduced level of engine thrust and to positions of brakes or thrust reversers that make possible a minimum deceleration in order for the aircraft to come to a stop at the end of a runway.

By way of an example, during a phase corresponding to the airport navigation, illustrated by the scale E shown in FIG. 6, the scale E will present a tenth slope characteristic value 90 corresponding to a reduced level of engine thrust and to inactive brakes or thrust reversers such that the aircraft 10 advances on the ground at a constant speed, the sixth slope characteristic value 74, the seventh slope characteristic value 78, and an eleventh slope characteristic value 91, corresponding to a predetermined level of deceleration in order to ensure passenger comfort.

When the aircraft 10 is on the ground, each slope characteristic value is then desirably selected from a second group of values including: the sixth slope characteristic value 74, the seventh slope characteristic value 78, the eighth slope characteristic value 86, the ninth slope characteristic value 88, the tenth slope characteristic value 90 and the eleventh slope characteristic value 91.

The person skilled in the art will thus understand that the displayed characteristic values depend on the phase of the flight (takeoff, cruise, approach, taxi, etc.), determined among other things by the measurement of aircraft parameters (altitude, speed, configuration of the aircraft).

The calculation software program 46 is capable of calculating the performance scale E based on a speed set point selected by the user or indeed based on an estimate or measurement of the speed of the aircraft 10 when no speed set point has been defined and servo-controlled.

The calculation software program 46 is configured in order to calculate the performance scale E by taking into account the characteristics of the aircraft selected from among the altitude of the aircraft, the speed of the aircraft, the temperature of the outside air, the state of the engines, the configuration of the aircraft, the weight of the aircraft and the icing conditions of the aircraft.

The altitude of the aircraft corresponds to the current altitude of the aircraft or to an estimate of the current altitude of the aircraft.

The speed of the aircraft corresponds to the current speed of the aircraft or to an estimate of the current speed of the aircraft.

The temperature of the outside air corresponds to the current temperature of the outside air or to an estimate of the temperature of the outside air.

The state of the engine corresponds in particular to the limits of power applied to the various engines.

The configuration of the aircraft corresponds in particular to the aerodynamic configuration of the aircraft, in particular to the position of the slats, the flaps, the airbrakes, the negative lift systems, and the landing gear of the aircraft, as well as to the number of engines of the aircraft in operation.

The weight of the aircraft corresponds to the current weight of the aircraft or to an estimate of the current weight of the aircraft.

The calculation program 46 is configured in order to determine the slope characteristic values of the performance scale E in particular based on pre-stored tables.

Figure 3:
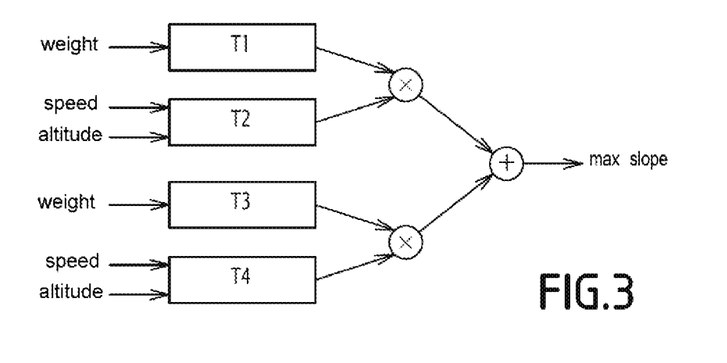
FIG. 3 is a diagram illustrating the use of interpolation tables that provide the ability to calculate the slope characteristic values of a performance scale.

For example, as illustrated in FIG. 3, for a given aircraft configuration, the maximum slope value is calculated based on tables having as input parameters the weight of the aircraft, its speed and altitude. Thus, T1 and T3 represent one dimensional interpolation tables having as input parameter the weight, and T2 and T4 represent two-dimensional interpolation tables having as input parameters the speed and altitude of the aircraft. Interpolation tables in three or more dimensions, not represented in FIG. 3, may also be used.

In the example shown in FIG. 3, the values of the output parameters of the tables T1 and T2 on the one hand, and T3 and T4 on the other hand, are multiplied with each other, and then the results of these multiplications are added. This latter result corresponds to a maximum slope value for a given aircraft configuration.

The calculation software 46 is capable of recalculating the performance scale E on a regular basis, for example every second or every 100 ms.

The determination software program 48 is able to determine the slope characteristic value associated with the guidance set point displayed in the form of slope value.

The determination software program 48 is also capable of calculating the value of an algebraic deviation $\Delta_c$ between the displayed guidance set point and the slope characteristic value associated with this displayed guidance set point.

The determination software program 48 is also capable of comparing this algebraic deviation $\Delta_c$ with the range of reference values $\Delta_{ref}$, the range of reference values $\Delta_{ref}$ being, for example, predetermined by the user, or even a function of the altitude and the phase of flight.

The algebraic deviation $\Delta_c$ and the range of reference values $\Delta_{ref}$ are expressed in degrees.

By way of an example, the upper bound of the range of reference values $\Delta_{ref}$ is comprised between 0.1° and 10° and is desirably equal to 0.3° and the lower bound of the range of reference values is comprised between −10° and −0.1° and is desirably equal to −0.3°.

Other values for the upper bound and the lower bound are obviously possible, with the value of the upper bound of the range of reference values being independent of the value of the lower bound of the range of values and the range of reference values not necessarily being centered around zero.

The positioning, calculation and transmission software program 50 is configured so as to set the value of the guidance set point to the associated slope characteristic value when conditions of adherence have been satisfied, such as when the algebraic deviation $\Delta_c$ belongs within the reference range $\Delta_{ref}$.

In other words, when the guidance set point is sufficiently close to a slope characteristic value of the performance scale E, with an algebraic deviation $\Delta_c$ belonging within the reference range $\Delta_{ref}$ and the conditions of adherence have been satisfied, the characteristic slope value is taken into account in place of the acquired value of the guidance set point displayed in the form of slope value. As illustrated in the respective FIGS. 4 and 6, the guidance set point displayed by the display software program 52 and respectively represented by the symbol 102 and 106, is then equal, to the first slope characteristic value 58, respectively to another slope characteristic value 107, as illustrated in the form of a link A, for example a segment in dotted lines, which characterises the adherence of the guidance set point with the associated slope characteristic value. The symbol 102, respectively 106 is then adhered to the characteristic slope symbol 58, respectively 107, and the two symbols are aligned in parallel to the horizon line and move together. In FIGS. 4 to 7, the symbol 102 represents a slope set point and the symbol 106 an acceleration on slope set point.

When the guidance set point is an acceleration on slope set point, the calculated algebraic deviation $\Delta_c$ corresponds, for example, to an algebraic deviation $\Delta_o$ between the slope set point symbol 102 and the acceleration on slope set point symbol 106, visible in FIG. 5.

In the general case, when the value of the guidance set point does not satisfy the conditions of adherence, such as when the calculated algebraic deviation $\Delta_c$ does not belong within the range of reference values $\Delta_{ref}$, then the calculation and transmission software 50 is able to calculate a control set point for the aircraft based on the guidance set point displayed and send this control set point to the different corresponding avionics systems from among one of the actuator control systems 14, 16, 17, 18 and one of the guidance systems 12, 19, 20.

When the value of the guidance set point satisfies the conditions of adherence, such as when the algebraic deviation $\Delta_c$ calculated belongs within the range of reference values $\Delta_{ref}$, then the calculation and transmission software 50 is also able to calculate a control set point for the aircraft, the calculated set point being servo-controlled relative to the performance characteristic value corresponding to the associated slope characteristic value. This control set point is then meant to be transmitted to the corresponding avionics system from among one of the actuator control systems 14, 16, 17, 18 and one of the guidance systems 12, 19, 20.

The display software program 52 is capable of displaying the information and data on the display screen 32, such as an artificial horizon line 94, a vertical speed scale 95 (visible in FIG. 4) on which a symbol 96 in the form of an oval shape represents the current vertical speed of the aircraft 10, a speed vector symbol 98, a slope set point symbol 102, and an acceleration on slope set point symbol 106 as represented in FIGS. 4 to 7. The speed vector symbol 98 indicates the current direction of the ground speed vector V$_s$ of the aircraft 10. The slope set point symbol 102 indicates the slope set point commanded by the user by means of the control stick 22. The algebraic deviation on the ordinates Δ$_1$ between the horizon line 94 and the speed vector symbol 98 represents the ground slope γ$_s$ of the aircraft. The algebraic deviation on the ordinates Δ$_2$ between the speed vector symbol 98 and the acceleration on slope set point symbol 106 represents the acceleration on slope set point, as represented in FIG. 4. The performance scale E displayed on the screen 32 has graduations in slope values of the aircraft, for example in degrees and has as for origin the artificial horizon 94.

Other symbols 98, 102, 106 are quite obviously possible for respectively representing the direction of the ground speed vector, the slope set point, and the acceleration on slope set point.

Figure 8:
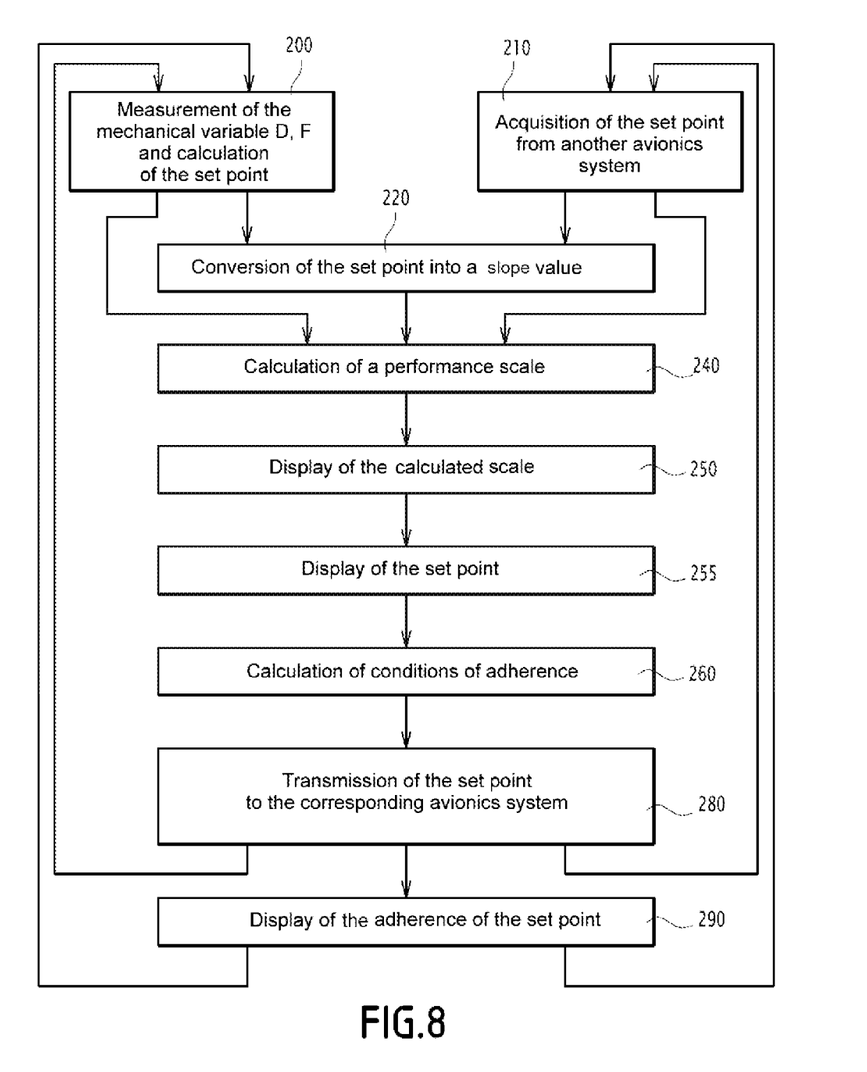
FIG. 8 is a flowchart of a method for determining a control set point of the aircraft.

The operation of the determination device 30 according to certain embodiments will now be described with reference being made to FIG. 8 representing a flow chart of the determination method.

During an initial step 200, the measurement and calculation software 40 begins with measuring the mechanical variable value D, F respectively of the control stick 22 and the lever 24, and then calculates two guidance set points, each based on the corresponding mechanical variable value D, F. Thus, it is possible to acquire two guidance set points for example, a slope set point based on the mechanical variable value D, F of the control stick 22 and an acceleration on slope set point based on the mechanical variable value D, F of the lever 24.

As previously described above, the mechanical variable value D, F respectively of the control stick 22, and the lever 24, corresponds to an increment of the guidance set point if the measured value of the mechanical variable D, F is positive, and conversely to a decrement of the guidance set point if the measured value of the mechanical variable D, F is negative. Alternatively, the mechanical variable value D, F respectively of the control stick 22 and the lever 24, directly corresponds to a level of the guidance set point.

Alternatively, the guidance set point is not determined based on the mechanical variable value D, F respectively of the control stick 22 and the lever 24, but is acquired during the step 210 by means of the acquisition software program 42 from an avionics system external to the determination device 30.

The FIGS. 4 to 7 illustrate different guidance set point values selected by the user by means of the lever 24, these values correspond respectively to a flight phase, a "roll-out" phase on the ground, a "taxi" phase on the ground, and a "take-off" phase on the ground.

The value of the guidance set point obtained during the step 200 or during the step 210 is converted if necessary, during the step 220, into a corresponding slope value expressed in degrees, in particular when the acquired guidance set point is an acceleration on slope set point expressed in m/s² or even for example if the guidance set point is a vertical speed set point designated with the control stick 22 or the control lever 24.

During the subsequent step 240, which follows the step 220 in the event of conversion or which directly follows the step 200 or 210, the calculation software 46 calculates the performance scale E as previously described above.

When the aircraft is in flight, the slope characteristic values correspond to the particular levels of engine thrust and to particular positions of the airbrakes. For example, as illustrated in FIG. 4, the software program 46 positions on the performance scale E the first 58, second 62, third 66, fourth 70, and fifth 71 slope characteristic values.

When the aircraft is on the ground, the slope characteristic values correspond to the ground acceleration levels. For example, as illustrated by FIGS. 5 to 7, the software program 46 associates with the performance scale E the sixth 74, seventh 78, eighth 86, ninth 88, tenth 90, and eleventh 91 slope characteristic values.

The performance scale E computed during the step 240 takes into account a speed set point selected by the user or an estimate of the speed of the aircraft if no speed set point has been defined. The calculation of the performance scale E also takes into account some characteristics of the aircraft selected from the altitude of the aircraft, the configuration of the aircraft, the weight of the aircraft, and the icing conditions of the aircraft.

The calculation of the performance scale E by the calculation software 46 is performed for example based on pre-stored tables, as illustrated in FIG. 3.

During the step 250, the display software program 52 displays the scale computed on the display screen 32.

During the step 255, the guidance set point expressed in degrees in the form of a slope value is displayed on the screen 32 thanks to the display software program 52. The guidance set point is identified by the slope set point symbol 102 or the acceleration on slope set point symbol 106 according to whether the guidance set point obtained is a slope set point (or a set point converted into slope set point) or an acceleration on slope set point converted into a slope value, as represented in FIG. 4.

The value of the slope set point corresponds to the algebraic deviation on the ordinates Δ$_3$ between a first reference symbol and the slope set point symbol 102. The first reference symbol is, for example, the horizon line 94.

The value of the acceleration on slope set point corresponds, for example, to the algebraic deviation on the ordinates Δ$_2$ between a second reference symbol and the acceleration on slope set point symbol 106. The second reference symbol is, for example, the speed vector symbol 98.

The second reference symbol is, for example, the slope set point symbol 102, and when the guidance set point is an acceleration on slope set point, the value of the acceleration on slope set point then corresponds to the algebraic deviation on the ordinates Δ$_0$ between the acceleration on slope set point symbol 106 and the slope set point symbol 102, as represented in FIG. 5.

Alternatively, not shown, the speed vector symbol is not displayed, and the reference symbol is formed by the artificial horizon line 94. According to this alternative, the deviation on the ordinates between the artificial horizon line 94 and the acceleration on slope set point symbol 106 then represents the acceleration on slope set point.

By way of example, the algebraic deviation on the ordinates Δ$_2$ is displayed in degrees, which then makes it possible to view the acceleration on slope set point Acc_cons by using a slope scale or attitude scale graduated in degrees. The algebraic deviation on the ordinates Δ$_2$ then satisfies the following equation:

$$\Delta_2 = \frac{180}{\pi} \times \frac{Acc\_cons}{g} \quad (2)$$

where 180/π represents the conversion factor for converting radians into degrees;

Acc_cons is the acceleration on slope set point in m/s$^2$; and g is the acceleration due to gravity in m/s$^2$.

According to yet another variant, not shown, the speed vector symbol is not displayed, and the reference symbol is formed by a speed vector set point symbol. The algebraic deviation on the ordinates between the speed vector set point symbol and the acceleration on slope set point symbol 106 then represents the acceleration on slope set point.

The symbols of the artificial horizon lines 94 and of the speed vector symbol 98 are, for example displayed on the screen 32 from the moment this screen 32 is turned on.

During the step 260, the determination software program 48 determines the slope characteristic value associated with this displayed guidance set point. The determination software program 48 then calculates the conditions of adherence between the displayed guidance set point in the form of slope value and the associated slope characteristic value. The calculation and transmission software program 50 further determines whether the conditions of adherence between the displayed guidance set point and the associated slope characteristic value have been satisfied.

For example, during this step 260, the determination software 48 calculates the value of the algebraic deviation $\Delta_c$ between the guidance set point displayed in the form of a slope value and the slope characteristic value associated with this displayed guidance set point.

The software program 50 then verifies whether the conditions of adherence of the guidance set point to the characteristic value associated with the scale E have been satisfied, for example the software program 50 checks whether the algebraic deviation $\Delta_c$ belongs within the range of reference values $\Delta_{ref}$ and the deviation $\Delta_c$ is reduced over the course of time.

During the subsequent step 280, the software program 50 then calculates the control set point of the aircraft.

When the conditions of adherence have been satisfied, the calculated control set point is servo-controlled relative to the characteristic performance value corresponding to the associated slope characteristic value, this associated slope characteristic value being determined during the step 260.

When the conditions of adherence have not been satisfied, the guidance set point value is not modified, and the calculated control set point is servo-controlled based on the guidance set point.

During this step 280, the calculated control set point is transmitted to the corresponding avionics system selected from one of the actuator control systems 14, 16, 17, 18 and one of guidance systems 12, 19, 20.

At the end of this step 280, in the event where the conditions of adherence have not been satisfied, the determination process begins again from steps 200 or 210, as is shown in FIG. 8.

During the optional step 290, when the conditions of adherence have been satisfied, for example when the calculated algebraic deviation $\Delta_c$ belongs within the range of reference values $\Delta_{ref}$, the software program 50 positions the value of the guidance set point at the associated slope characteristic value, and displays on the screen 32 the link A between the guidance set point and the associated slope characteristic value.

Finally, upon completion of the step 290, the determination process begins again from the steps 200 or 210, as may be seen in FIG. 8.

Thus, in flight, when a first guidance set point is an air speed set point $V_c$, and when a second guidance set point is a slope set point corresponding for example, to the first value 58 of the performance scale E, in other words, the slope set point symbol 102 being adhered to the first value 58 of the scale E, a servo-control of the speed set point $V_c$ by using the vertical control axis of the flight controls 12 and a servo-control of the level of thrust and drag corresponding to the first value 58 are implemented, in a manner so as to obtain the two control set points calculated during the step 280, one of these control set points being the speed set point $V_c$ of the aircraft and the other being the thrust level corresponding to the first value 58 of the performance scale E.

In flight when the second guidance set point is for example a slope set point that does not correspond to the values of the performance scale E, a servo-control of the vertical trajectory by using the vertical control axis of the flight controls 12 is implemented in order to hold the slope set point, and a servo-control of the level of thrust and drag is implemented in order to hold the speed set point $V_c$ of the aircraft.

In a general manner, when the guidance set point displayed in the form of a slope value is an acceleration on slope set point that satisfies the conditions of adherence, a servo-control of the level of thrust and drag is implemented relative to the corresponding control set point calculated during the step 280.

In addition, the determination device 30 according to certain embodiments enables the crew 26 to view the domains of the slope and acceleration on slope accessible by the aircraft, as well as the selected guidance set point. For example, the relative position of the symbol 102 of the slope set point relative to the slope characteristic values 74, 78 at the extremes of the performance scale E allows the crew 26 to determine whether the air speed set point can be held. In addition, the relative position of the symbol 106 for the acceleration over slope set point relative to the symbol 102 of the slope set point allows the crew to determine whether an increase or decrease in the air speed is being commanded.

The determination device 30 also provides the ability to reduce the workload of the crew and thus the risks of accidents by determining the control set point based on the guidance set point displayed in the form of slope value, the guidance set point being in particular set to be equal to a characteristic value of the performance scale E, when the conditions of adherence have been satisfied, that is to say, for example, when the algebraic deviation $\Delta_c$ between the guidance set point and the characteristic value belongs within the range of reference values $\Delta_{ref}$, this characteristic value of the scale E itself corresponding to a performance characteristic value.

Thus it may be understood that the determination method and device 30 according to the certain embodiments provides the ability to determine the control set point based on the guidance set point displayed in the form of a slope value, the control set point being servo-controlled on the domains of performance that are achievable by the aircraft, in order to enhance the flight safety of the aircraft and reduce the workload of the crew.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for determining a control set point of an aircraft, the control set point being configured to be transmitted to at least one avionics system from at least one actuator control system and at least one guidance system, the method being carried out by an electronic device for determining the control set point and comprising:
    calculating a performance scale in the form of slope values of the aircraft, the performance scale comprising at least one slope characteristic, each slope characteristic value being associated with a corresponding performance characteristic value from among extreme values of thrust, extreme values of drag, extreme values of ground acceleration, predetermined specific values of thrust, predetermined specific values of drag, predetermined specific values of ground acceleration and characteristic values of guidance set points;
    acquiring at least one guidance set point;
    displaying at least one guidance set point among the acquired guidance set point(s), in the form of a slope value with respect to the performance scale;
    determining at least one slope characteristic value associated with a corresponding guidance set point, displayed in the form of a slope value; and
    calculating at least one control set point for the aircraft, each control set point being calculated relative to the performance characteristic value corresponding to the associated slope characteristic value for each guidance set point displayed in the form of a slope value.

2. The method of claim 1, wherein the associated slope characteristic value is the slope characteristic value which, among the slope characteristic value(s) towards which the displayed guidance set point converges, is the closest to the displayed guidance set point.

3. The method of claim 1, wherein the associated slope characteristic value is the slope characteristic value which is the closest to the displayed guidance set point.

4. The method of claim 1, further comprising:
    calculating a deviation between each displayed guidance set point and each slope characteristic value associated with the displayed guidance set point, and
    positioning the value of the guidance set point at the associated slope characteristic value, only when the calculated deviation belongs to a predetermined range of values.

5. The method of claim 4, wherein the positioning of the value of the guidance set point at the associated slope characteristic value is displayed in the form of a link between a symbol representing the guidance set point and the associated characteristic slope.

6. The method of claim 1, wherein the aircraft comprises at least one primary control member adapted to be manipulated by the user in order to select a guidance set point, and the acquired guidance set point is a set point which is selected using the primary control member.

7. The method of claim 1, wherein the performance scale is calculated based on a speed selected from a speed set point, and an estimate of the speed of the aircraft.

8. The method of claim 1, wherein the performance scale is calculated by taking into account the characteristics of the aircraft selected from the altitude of the aircraft, a configuration of the aircraft, the weight of the aircraft and the icing conditions of the aircraft.

9. The method of claim 1, wherein the performance scale comprises graduations in slope values, the origin of the performance scale corresponding to an artificial horizon.

10. The method of claim 1, wherein when the acquired guidance set point is not a slope set point, the acquired guidance set point is converted into a slope value to be compared to the values of the performance scale.

11. The method of claim 1, wherein the acquisition step comprises the acquisition of two guidance set points, the displaying step comprises the display of two guidance set points, each in the form of a slope value with respect to the performance scale and the calculating step comprises the calculation of two respective control set points.

12. The method of claim 1, wherein each slope characteristic value is selected from:
    a first group of values comprising:
        a first value associated with a maximum level of engine thrust and with a retracted air brakes position, a second value associated with an engine thrust level and with a retracted air brakes position, a third value associated with a reduced level of engine thrust and with an intermediate position between retraction and deployment of the air brakes, a fourth value associated with a minimum level of engine thrust and with a fully deployed position of the air brakes, a fifth value associated with a specific level of engine thrust and with a retracted position of the air brakes; and
    a second group of values comprising:
        a sixth value associated with a maximum level of engine thrust and with inactive brakes or thrust reversers, a seventh value associated with a maximum braking level of the brakes with the use of thrust reversers at their maximum level, an eighth value associated with a reduced level of engine thrust and with the positions of brakes or thrust reversers set so as to reach an exit of a runway, a ninth value associated with a reduced level of engine thrust and with the positions of brakes or thrust reversers set so as to bring the aircraft to a stop at the end of a runway, a tenth value associated with a reduced level of engine thrust and with inactive brakes or thrust reversers, an eleventh value associated with a predetermined level of deceleration.

13. A non-transitory computer readable medium including a computer program comprising of software instructions that, when carried out by a computer, implement the method according to claim 1.

14. An electronic device for determining a control set point of an aircraft, the control set point being configured to be transmitted to at least one avionics system from at least one actuator control system and at least one guidance system, the device comprising:
- a calculation capability for calculating a performance scale in the form of slope values of the aircraft, the performance scale comprising at least one slope characteristic value, each slope characteristic value being associated with a corresponding performance characteristic value from among extreme values of thrust, extreme values of drag, extreme values of ground acceleration, predetermined specific values of thrust, predetermined specific values of drag, predetermined specific values of ground acceleration and characteristic values of guidance set points;
- an acquisition capability for acquiring at least one guidance set point;
- a display capability for displaying of at least one guidance set among the acquired guidance set point(s), in the form of a slope value with respect to the performance scale;
- a determination capability for determining at least one slope characteristic value associated with a corresponding guidance set point, displayed in the form of a slope value; and
- a calculation capability for calculating at least one control set point for the aircraft, each control set point being calculated relative to the performance characteristic value corresponding to the associated slope characteristic value for each guidance set point displayed in the form of a slope value.

15. The device of claim 14, wherein the device further comprises:
- a calculation capability for calculating a deviation between each displayed guidance set point and each slope characteristic value associated with the displayed guidance set point; and
- a positioning capability for positioning the value of the guidance set point at the associated slope characteristic value, only when the calculated deviation belongs to a predetermined range of values.

16. An aircraft including:
- at least one avionics system selected from at least one actuator control system, and at least one guidance system;
- an electronic device for determining a control set point of the aircraft, the control set point being configured to be transmitted to the corresponding avionics system,
- wherein the electronic device is in accordance with claim 14.

* * * * *